2 Sheets—Sheet 1.
T. HOLLAND.
LUBRICATOR.
No. 10,143. Reissued June 27, 1882.
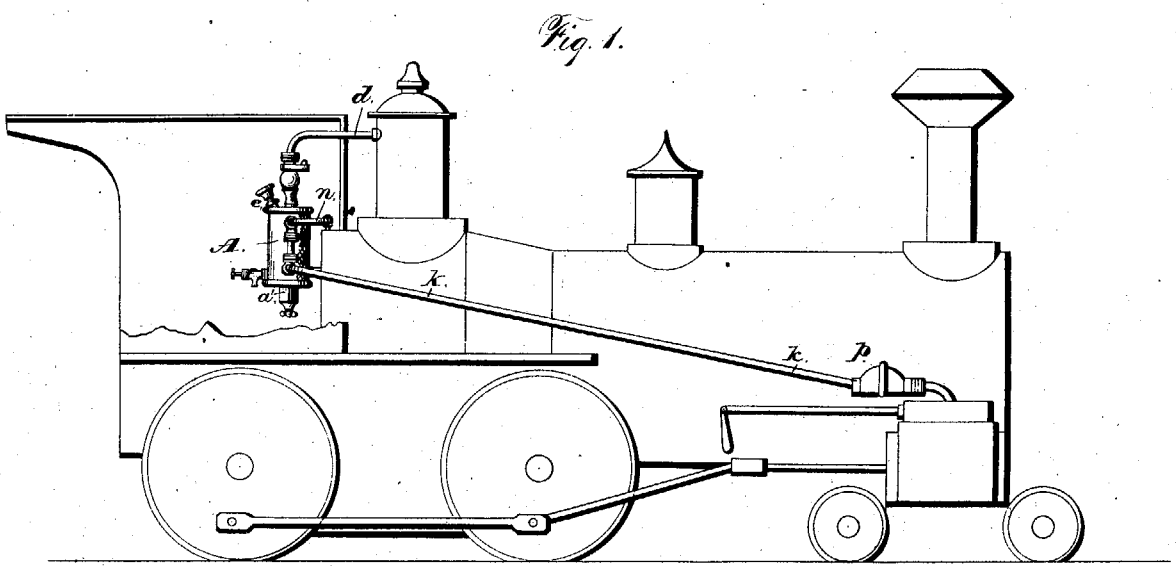
Witnesses.
Jas. E. Hutchinson.
J. A. Rutherford
Inventor.
Timothy Holland,
By his Attorney,
James L. Norris.
N. PETERS, Photo-Lithographer, Washington, D. C.

T. HOLLAND.
LUBRICATOR.
No. 10,143. Reissued June 27, 1882.
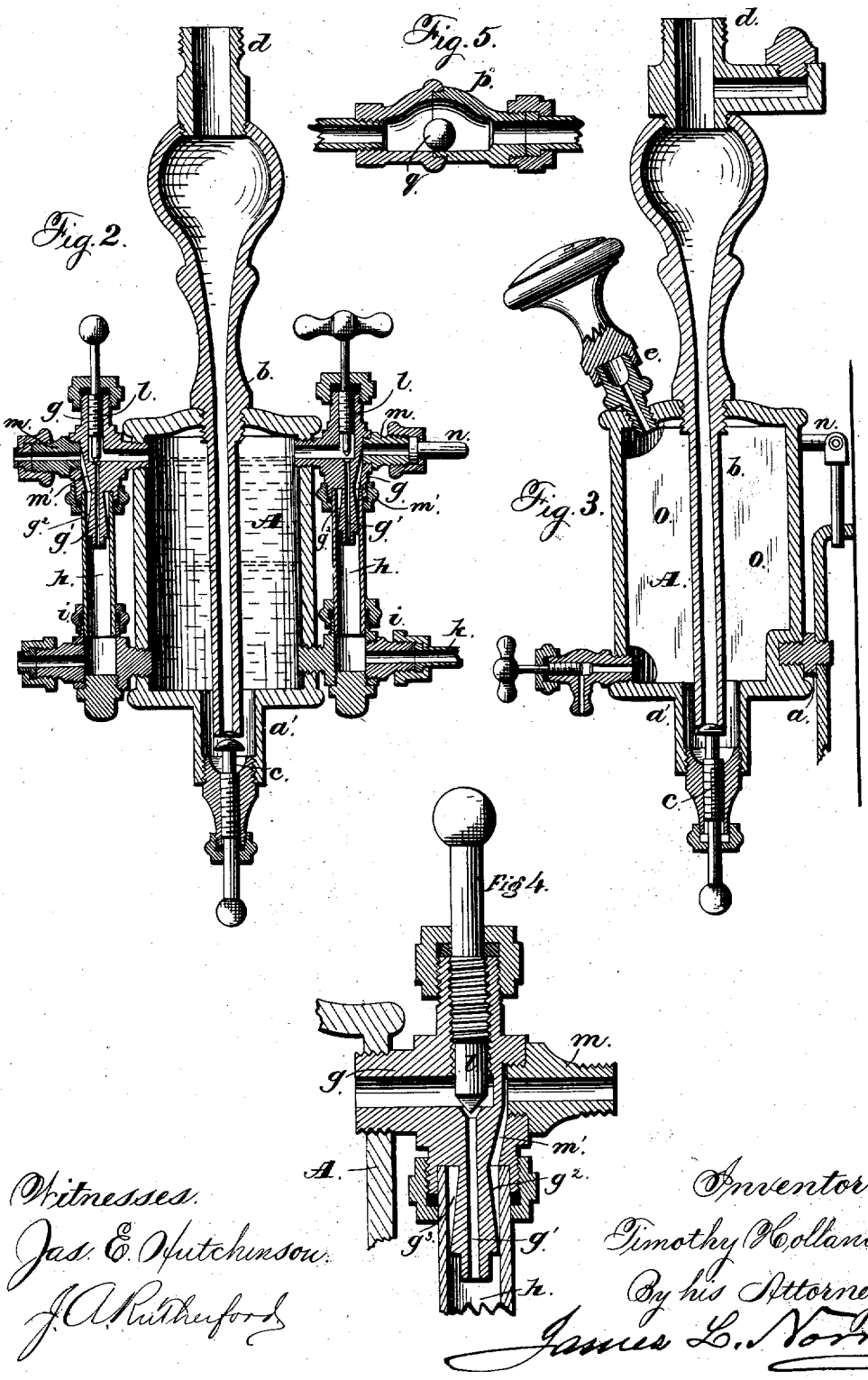
Witnesses.
Jas. E. Hutchinson.
J. A. Rutherford
Inventor.
Timothy Holland,
By his Attorney,
James L. Norris.
N. PETERS, Photo-Lithographer, Washington, D. C.

UNITED STATES PATENT OFFICE.

TIMOTHY HOLLAND, OF TROY, NEW YORK.

LUBRICATOR.

SPECIFICATION forming part of Reissued Letters Patent No. 10,143, dated June 27, 1882.

Original No. 243,900, dated July 5, 1881. Application for reissue filed June 1, 1882.

*To all whom it may concern:*

Be it known that I, TIMOTHY HOLLAND, a citizen of the United States, residing at Troy, in the county of Rensselaer and State of New York, have invented new and useful Improvements in Lubricators, of which the following is a specification.

This invention relates to improvements in the lubricator for which Letters Patent No. 11,958 were issued to John Absterdam on the 21st day of November, A. D. 1854, which lubricator consists of a reservoir for containing the oil, connected with one end of a pipe containing an elevated water-column, subjected to steam-pressure from a boiler, whereby the oil is caused to flow in drops from the reservoir by hydrostatic pressure through a transparent vessel, where the feed of the oil can be inspected, in order to determine at any time if the apparatus is performing its work of regularly feeding drops of oil to a pipe which conveys the same to the part to be lubricated.

The objects of my invention are to utilize the principle present in the invention forming the subject-matter of the aforesaid Letters Patent, but improve its mode of operation, construction, and efficiency by providing means whereby the drops of oil, as they are delivered to or pass through the transparent feed-indicating vessel, are subjected to the action of steam for impelling or driving them through said feed-indicating vessel to the part to be lubricated; by providing a single oil-reservoir with means whereby it will serve to lubricate both cylinders or steam-chests of a locomotive, and by providing a novel construction of nipple for delivering the oil in drops from the reservoir to the transparent feed-indicating vessel, all of which materially increase the efficiency of the lubricator and render it very desirable, especially to engineers of locomotives.

The objects of my invention are accomplished by the construction and arrangement of parts illustrated in the accompanying drawings, in which—

Figure 1 is a side elevation, in outline, of a locomotive, showing the arrangement of the lubricator thereon. Fig. 2 is a vertical sectional view of the lubricator. Fig. 3 is a similar section taken at right angles to Fig. 2. Fig. 4 is a detail section, on an enlarged scale, of the drop-valve and nozzle or nipple, and Fig. 5 is a detail sectional view of an air-valve and chamber located in the pipe through which the oil is conveyed to the steam-chest.

Referring to the drawings, the letter A indicates an oil reservoir or chamber provided with a screw-nipple, *a*, by which it is secured to the front plate of a boiler, and to the upper end of the reservoir or chamber is attached a steam-pipe, *b*, which extends through the latter into a contracted neck, *a'*, provided at the bottom of the reservoir, while the upper end of the steam-pipe *b* is connected by a pipe, *d*, with the steam-dome of the boiler. A screw-valve, *c*, and a stuffing-gland are fitted in the said neck, the valve seating on the lower end of the steam-pipe *b*, for the purpose of regulating the entrance of condensed steam, and the reservoir is provided with a plug, *e*, for supplying the same with oil. The opposite sides of the reservoir are provided with tubular plugs *g* and other devices for the outlet of oil, and as both sides are of similar construction a description of one will be sufficient.

On the outer end of the plug *g* is formed a depending nozzle or nipple, *g'*, communicating with the reservoir by the passage through said plug, and the lower end of said nozzle or nipple is reduced to a point, so that the oil will drop therefrom.

To the nipple *g* is secured the upper end of a vessel or tube, *h*, of glass or other material of a transparent nature, while the lower end of the vessel or tube is sustained by a hollow plug, *i*, that is tapped into the side of the reservoir, there being, however, no communication between the reservoir and the plug except through the vessel or tube *h*. This vessel or tube, being of glass or other transparent material, serves as a feed-indicator, for the reason that the drops of oil can be inspected as they pass through the vessel or tube in their passage to the parts to be lubricated.

The plug *g* is provided with a screw-valve, *l*, for closing the orifice through the same and for regulating the flow of oil.

To the side of the plug *g* is attached a hollow nipple, *m*, which communicates with the upper portion of the feed-indicating vessel or tube by means of a passage, *m'*, and the nipple *m* also connects, by a pipe, *n*, with the steam-space of the boiler, all in such manner that steam is delivered upon the drops of oil as they enter or pass through the feed-indicating vessel or tube $h$, and are thereby impelled, driven, or forced through said vessel or tube, in drops visible to the attendant, to a pipe, $k$, which connects with the cylinder or steam-chest of the engine. By this means the drops are impelled to the part to be lubricated by steam-pressure; but while acted on by the steam they are carried through a transparent vessel or tube, whereby they are rendered visible in their forcible transit through said vessel or tube in their passage to the parts to be lubricated, which will be of obvious advantage to those familiar with devices for lubricating locomotives.

The pipe $n$ is made in the form of two branches, so as to connect with both feed-indicating vessels or tubes, and thereby provide an equal steam-pressure in both, and a cock is provided in the said pipe to regulate the inflow or supply of steam. The nozzle or nipple $g'$ is cut away, as at $g^2$, to form a deflecting-chamber, $g^3$, whereby the entering current of steam will be deflected to the inner surface of the transparent feed-indicating tube. This also permits the formation of the oil-drops on the nipple without interference from the current of steam, and hence the descending oil will not be sprayed off from the end of the nipple in small globules by the direct action of the steam-current. The screw-valves $l$ allow regulation of the outlet of oil to the respective steam-chests and cylinder. I find it necessary to regulate the flow to each cylinder separately, for the reason that one cylinder will often take more oil than the other. To facilitate a uniform supply to both cylinders from the one oil-chamber, the chamber A is fitted with a vertical partition, $o$, which divides the space into two portions, having no communication except at the bottom of tube $b$ through the small chamber $a'$. The plugs $g$ enter at opposite sides of the partition, and the oil being thus kept separate, the flow to either plug will not be affected by superior suction at the other.

In the pipe $k$, near the steam-chest, there is coupled a hollow valve-chamber, $p$, which may be simply a tube of larger size than the oil-pipe. In this chamber is a loose ball-valve, $q$, playing between the opposite ends of the pipe $k$, which are ground to form seats for the valve. Normally the valve $q$ rests between the ends, separated from both, so that the oil can pass freely to the steam-chest; but in case the pressure at either side overbalances the valve is carried against the end of the pipe, and thus the oil and water of condensation are prevented from being driven back through the tube $k$ or into the steam-chest in a jet, as the case may be. The principal object of the valve $q$ is to prevent the interruption or variation of the supply-oil by the air-pressure when the engine is running without steam. In that case the effects of the suction and compressing created by the movement of the piston in the cylinder are cut off by the described movements of the automatic valve.

In practice the oil-reservoir is supplied with oil to about one-half to two-thirds the depth thereof. Water is then supplied until the surface of the oil is level with orifices in the outlet-plugs $g$, after which steam is admitted to the pipe $d$, and, acting on the column of water contained in the pipe $b$, causes the same to gradually expel the oil through outlet-plugs $g$, from which it is delivered to the feed-indicating vessels or tubes $h$ in form of drops or globules. As the drops of oil form on the nipples $g'$ they are out of the immediate current of the steam, which has been deflected to the side of the glass, and when they fall they are acted upon by the steam supplied through pipe $n$, and hence are driven, forced, or impelled through the transparent feed-indicating vessel or tube in visible drops to the pipes $k$, and through said pipes to the cylinders or steam-chests.

While I prefer the described relative location and arrangements of the parts, I do not limit myself in those respects. The construction shown insures a uniform and separate supply of lubricant to the cylinders and provides for the convenient regulation of the feed.

What I claim is—

1. In a lubricator wherein the oil is delivered from an oil-reservoir to a transparent feed-indicating vessel or tube in the form of drops, the combination, with said indicating vessel or tube, of a steam-pipe for delivering steam upon the oil and impelling or driving it through the vessel or tube in visible drops.

2. The combination, with the transparent feed-indicating tube of a lubricator through which the oil passes in its transit to the part to be lubricated, of a steam-pipe for delivering steam upon the oil as it enters or passes through said transparent feed-indicating vessel or tube, substantially as and for the purpose described.

3. In a lubricator, the nipple $g'$, extended down a short distance within tube $h$ and cut out to form a steam-deflecting chamber, substantially as described, for the purpose set forth.

4. The combination, with two devices, one at each side, for conveying the oil separately to each chest, of an oil-reservoir, A, having the bottom chamber, $a'$, and a partition extending down into but not quite to the lower end of said chamber, as shown and described.

5. In lubricators, the combination, with an oil chamber or reservoir fitted with a steam-supply pipe, of two oil-conduit plugs and outflow-pipes for delivery of the oil to the separate chests of a locomotive, and a steam-pipe connecting the outflow-pipes directly to the boiler, substantially as shown and described.

In testimony whereof I have hereunto set my hand in the presence of the subscribing witnesses.

TIMOTHY HOLLAND.

Witnesses:
JOHN H. O'BRIEN,
JNO. P. O'BRIEN.